(12) United States Patent
Davidson

(10) Patent No.: US 6,746,611 B2
(45) Date of Patent: Jun. 8, 2004

(54) METHOD AND COMPOSITION FOR SCAVENGING SULPHIDE IN DRILLING FLUIDS AND COMPOSITION

(75) Inventor: Eric Davidson, Aberdeen (GB)

(73) Assignee: Halliburton Energy Services, Inc., Duncan, OK (US)

( * ) Notice: Subject to any disclaimer, the term of this patent is extended or adjusted under 35 U.S.C. 154(b) by 185 days.

(21) Appl. No.: 10/053,156

(22) Filed: Jan. 16, 2002

(65) Prior Publication Data
US 2002/0096366 A1 Jul. 25, 2002

(51) Int. Cl.$^7$ .................................................. C02F 1/58
(52) U.S. Cl. ........................ 210/725; 175/65; 210/727; 210/729; 507/139; 507/145
(58) Field of Search ................................ 210/718, 725, 210/727, 728, 729, 747, 750, 751; 175/65; 507/139, 145

(56) References Cited

U.S. PATENT DOCUMENTS

| | | | | |
|---|---|---|---|---|
| 3,933,993 A | * | 1/1976 | Salemme | 423/226 |
| 4,252,655 A | | 2/1981 | Carney | 252/8.5 C |
| 4,526,693 A | * | 7/1985 | Son et al. | 507/139 |
| 4,539,122 A | * | 9/1985 | Son et al. | 507/260 |
| 4,756,836 A | | 7/1988 | Jeffrey et al. | 210/750 |
| 5,188,179 A | | 2/1993 | Gay et al. | 166/310 |
| 5,314,750 A | | 5/1994 | Takedoi et al. | 428/402 |
| 5,472,633 A | * | 12/1995 | Griffin et al. | 252/189 |
| 5,749,418 A | | 5/1998 | Mehta et al. | 166/292 |
| 6,365,053 B1 | * | 4/2002 | Sunde et al. | 210/747 |

FOREIGN PATENT DOCUMENTS

| | | |
|---|---|---|
| EP | 0 153 192 | 8/1985 |
| GB | 1 588 566 | 4/1981 |

OTHER PUBLICATIONS

M.S. Bizanti, A. Moonesan & R.M. Caruthers, Reduction Feasbility of Itabirite Mud Abrasion, SPE 17163, SPE Formation Damage Control Symposium, Bakersfield, California, Feb. 5–8, 1988.

R.L. Brazzel, An Evaluation of Specular Hematite In Polymer Mud, Petroleum Engineer International, Oct. 1988, pp. 23 et seq.

Zulay Rodriguea N., Freddy Quiroga, and Francisco M. Garcia, Orimatita: The Venezuelan Weighting Agent for Drilling Muds, vol. 4, No. 2, Vision Technologica pp. 99–103 (1997).

* cited by examiner

Primary Examiner—Peter A. Hruskoci
(74) Attorney, Agent, or Firm—Craig W. Roddy; Karen B. Tripp

(57) ABSTRACT

An environmentally friendly method and composition is provided for removing hydrogen sulphide from fluids at high pH. The method and composition are particularly suited for removing hydrogen sulphide from drilling fluids used in drilling boreholes in hydrocarbon bearing subterranean formations, and are suitable for use with any drilling fluid, including polymer based drilling fluids. The sulphide scavenger used in the method and composition is a ferrous gluconate, an organic iron chelating agent stable at pH as high as 11.5, the pH preferred for drilling fluids that may encounter hydrogen sulphide. Further, this additive has been found to enhance the resilience of the rheological properties of drilling fluids to hot rolling and comparable field conditions.

6 Claims, No Drawings

METHOD AND COMPOSITION FOR SCAVENGING SULPHIDE IN DRILLING FLUIDS AND COMPOSITION

RELATED APPLICATION

This application claims priority to International Patent Application No. PCT/IB99/01341, filed Jul. 29, 1999.

BACKGROUND OF THE INVENTION

1. Field of the Invention

This invention relates to methods and compositions for removal or inactivation of hydrogen sulphide or soluble sulphide ions from drilling fluids used in drilling wells in subterranean formations. The invention is also applicable to removal of hydrogen sulfide or soluble sulfide ions from other fluids such as fluids in sewage systems and fluids produced from subterranean wells. The advantages of the invention are particularly appreciated with high pH fluids containing polymers.

2. Description of Relevant Art

Drilling a well in a hydrocarbon bearing subterranean formation for the production of hydrocarbons from said formation typically involves use of a drilling apparatus and drilling fluid. The drilling apparatus usually comprises a bit mounted on a string of hollow steel pipe. This hollow pipe is often used to rotate the bit to enable the bit to cut into the formation. The hollow pipe also acts as a conduit for the drilling fluid to be pumped down to the bottom of the hole, from where it rises to the surface via the annulus between the drill string and the borehole wall. The drilling fluid has many functions, one of the most important of which is to convey the cuttings from the bit downhole up to the surface of the well.

Good shear thinning rheology is an important property for drilling fluids. This property is generally achieved in one of two ways by using a dispersion of colloidal clay minerals such as smectite clays, e.g., bentonite, or by using polymers such as xanthan gum or scleroglucan that can be dispersed in aqueous solutions to give shear thinning fluids. Each approach has known advantages and disadvantages, although use of polymers seems to be the modern trend. Systems based on dispersed colloids are susceptible to the effects of dispersing and flocculating agents, whereas the rheology of polymer based fluids is more easily controlled. A disadvantage of many polymers, however, is that, since they are polyols, they are susceptible to crosslinking at high pH by the presence of even a low concentration of multivalent cation, such as iron (III) ions.

In drilling some subterranean formations, and often particularly those bearing oil or gas, hydrogen sulphide accumulations are frequently encountered. The drilling fluid brings the hydrogen sulphide to the surface. Such sulphide in the drilling fluid is problematic, as it can corrode the steel in the drilling apparatus and may be liberated into the atmosphere as toxic sulphide gas at the well surface.

Generally, to protect the health of those working with the drilling fluid and those at the surface of the well, conditions should be maintained to ensure that the concentration of hydrogen sulphide above the fluid, emitted due to the partial pressure of the gas, is less than about 15 ppm. The partial pressure of hydrogen sulphide at ambient temperature is a function of the concentration of sulphide ions in the fluid and the pH of the fluid. To ensure that the limit of 15 ppm is not exceeded even for the maximum sulphide concentration that may be encountered in a subterranean formation, the pH of the drilling fluid is typically maintained at a minimum of about 11.5. Also, to prevent the soluble sulphide concentration in the fluid from becoming excessive, action is routinely taken to remove sulphide from the fluid.

A common process for removing sulphide from drilling fluids is by precipitation, usually with a solid zinc compound. Zinc compounds commonly used are zinc oxide and zinc carbonate. These compounds react with hydrogen sulphide to form insoluble zinc sulphide. In insoluble form, the sulphide is relatively harmless (unless the pH falls to acid conditions) and can be removed from the fluid by known separation techniques.

Because these zinc compounds are solids, the reaction rate can be slow, which is especially undesirable when high concentrations of sulphide are encountered or when removal of final traces of sulphide is desired. However, soluble zinc salts can not be used as they hydrolyze at low pH, forming gelatinous hydroxide. While the gelatinous hydroxide would still react with the sulphide, the gelatinous solid would likely interfere with the rheological properties of the drilling fluid. Also, zinc salts behave as acids and tend to reduce the pH of the fluid, increasing the risk of greater emission of hydrogen sulphide into the air.

U.S. Pat. No. 4,242,655 to Carney discloses a soluble form of zinc in a chelated from for use as a hydrogen sulfide scavenger in an oil well. The chelating agents disclosed in U.S. Pat. No. 4,242,655 are low molecular weight hydrocarbon based materials containing acetic or nitrogen functional groups with a stability constant in the range of about 10–16, as described by Chaber Martell in Organic Sequestering Agents. Zinc chelates with a stabilizing constant outside of this range of about 10–16 are said to be either ineffective for removing soluble sulphide ion or to adversely affect the rheology of the well fluid.

Various zinc compounds—both soluble and insoluble—have been used as sulphide scavengers for many years and are generally regarded as an industry standard. However, all zinc compounds have the disadvantage that zinc is regarded as a toxic heavy metal whose discharge must be carefully controlled to protect the environment. When a zinc scavenger is used in the drilling fluid, the cuttings, as well as the residual fluid at the end of the drilling operation, will be contaminated with zinc. Environmental awareness is growing worldwide and discharge of waste containing zinc into the sea or uncontrolled land fill sites is becoming increasingly unacceptable. However, if all zinc contaminated waste from drilling activities had to be directed to special waste disposal sites, many commercial operations would be unviable.

Most other heavy metals which react with hydrogen sulphide to form insoluble sulphide such as copper (both oxidation states), mercury, lead, and nickel, also cause environmental concerns and thus are no more acceptable than zinc.

An exception is iron, a metal, that also forms insoluble sulphide upon reaction with hydrogen sulphide but which is largely free from environmental concerns. Iron salts, however, have been found to be unsuitable as sulphide scavengers because the compounds are not stable in solutions at high pH. At the pH used in drilling fluids, both iron (II) and iron (III) are precipitated as gelatinous iron hydroxide, which would have unacceptable effects on the rheology of the drilling fluid.

Solid $Fe_3O_4$ has sometimes been added to drilling fluids in the same way as basic zinc carbonate, but the reaction of the iron oxide is slower than zinc carbonate, particularly at the high pH required for drilling fluids exposed to hydrogen sulphide. The reason for the slower action of the iron compound compared to that of zinc is not fully understood. However, currently available sulphide scavengers based on iron are widely recognized as less efficient and less effective scavengers than scavengers based on zinc. Consequently, the environmentally attractive option has been the less effective option.

U.S. Pat. No. 4,756,836 to Jeffrey et al. teaches using an iron chelate as a downhole hydrogen sulphide scavenger in drilling mud, particularly water based clay muds. This patent discloses chelates of iron with hydroxethylethylenediaminetriacetic acid (HEDTA), nitrilotriacetic acid (NTA), ethylenediaminetetraacetic acid (EDTA), and diethylenetriaminepentaacetic acid (DTPA). The chelates are said to convert hydrogen sulphide to sulphur. Claimed advantages of this invention are said to be that the iron chelate is regenerated by oxygen at the surface and that the iron scavenges oxygen in the mud stream to cut down oxygen assisted corrosion of the drill stem. This patent further teaches that whether the iron is supplied in the Fe (II) or Fe(III) form, exposure to oxygen at some point in the mud flow changes the form to Fe (III) to prepare the chelate for hydrogen sulphide conversion. Oxygen exposure in an aerated mud pit or in the shale shaker or by another oxygen source is said to aid regeneration of the iron chelate.

While iron (III) is known to readily chelate with EDTA, NTA and HEDTA and DTPA, such complexes have limited stability at high pH. Iron in these complexes is well known to tend to precipitate out as ferric hydroxide at a pH greater than 9. For example, manufacturers of these chelates typically quote stability or effectiveness as an Fe(III) chelate, of NTA at pH 1–3, DPTA at pH 1–7, EDTA at pH 1–6, and HEDTA at pH 1–9. At pH higher than such ranges, these chelating agents lack ability to stabilize the iron against precipitation as the hydroxide. For effective use as a scavenger according to the teachings of Jeffrey invention of U.S. Pat. No. 4,756,836, the iron must stay in chelated form. Further, the multivalent nature of iron III is likely to cause crosslinking of polymers in a polymer based drilling mud, leading to gelation and interference with the rheology of the fluid.

A continuing need exists for environmentally friendly hydrogen sulfide scavengers suitable and effective for use in polymer based drilling fluids.

SUMMARY OF THE INVENTION

The present invention provides an environmentally friendly method of removing hydrogen sulphide or sulphide ions from fluids having a pH in excess of about 9 and even ranging as high as about 11 to 12 or higher. In the method, iron chelating agents having stability at such high pH, particularly ferrous gluconates, are added to the fluid in quantities sufficient to form iron sulphide with the sulphide ion. Stronger chelation of iron may be realized by adding an excess of the gluconate group than the stoichiometric equation would suggest would be required for the chelation. The iron chelating agent is mixed with the fluid and an iron sulphide precipitate is formed. The hydrogen sulphide or sulphide ion concentration in the fluid may be maintained at or below a desired level by maintaining the iron chelating agent content of the fluid at a certain effective level.

This method is particularly suited for removing hydrogen sulphide from a drilling fluid used in drilling a well or borehole in a hydrocarbon bearing formation where hydrogen sulphide is frequently encountered. The pH of such drilling fluids is commonly maintained at about 11.5 to keep the hydrogen sulphide in solution in the fluid and to avoid hydrogen sulphide emission into the air at the surface of the well.

The present invention further comprises an additive for drilling fluids comprising iron chelating agents having stability at a pH in excess of about 9 and most preferably in excess of about 11. The additive comprises ferrous gluconate in an effective amount for removing hydrogen sulphide from said fluid.

DESCRIPTION OF THE PREFERRED EMBODIMENT

In the past, the limited stability of known iron chelating agents such as nitrilotriacetic acid (NTA), ethylenediaminetetraacetic acid (EDTA), hydroxyethylenediaminetriacetic acid (HEDTA) and diethylenetriaminepentaacetic acid (DTPA), limited their utility as sulphide scavengers for high pH drilling fluids typically used in drilling wells in subterranean formations. The sulphide scavenger mechanism suggested by U.S. Pat. No. 4,242,655 to Carney—that the metal complex needs to be strong enough to confer stability in a solution of high pH, i.e., so that the metal is not precipitated as the hydroxide, but conversely the solubility of the sulphide needs to be sufficiently low so as to allow the metal to be removed from the chelated form and precipitated as the sulphide—has further cast doubt on the utility of iron compounds as a sulphide scavenger in drilling fluids. That is, the solubility product of iron II hydroxide is $8.0 \times 10^{-16}$, whereas the solubility product of iron sulphide is $8.0 \times 10^{-18}$, values differing by only a relatively small factor of 100. Generally, the solubility products of metal salts such as sulphides and hydroxides are a guide to the solubility of the salts. Hence, the small difference in solubility product between iron sulphide and iron hydroxide has indicated that iron chelating agents may have very limited utility as sulphide scavengers.

Efforts to locate an iron chelating agent for use as a sulphide scavenger at high pH applying the teaching of U.S. Pat. No. 4,756,836 to Jeffrey et al. have resulted in tests of ethylenediaminebis(2-hydroxyphenylacetic acid)(EDDHA) and similar multidentate ligands. The tests have indicated that EDDHA and EDDHA type compounds show stability as iron chelating agents at pH 11, but tend to form gels in drilling fluids. Such gels are believed to result from crosslinking of the polymers in the fluids caused by the trivalent iron ions in these compounds. Gels in drilling fluids are likely to cause rheological problems, making the fluid difficult to pump, and efforts to pump the fluid could lead to fracturing the well.

Specifically, test of Fe(III) EDDHA complex in a polymer-based fluid showed the following observations: at pH 11.5, a brown ferric hydroxide precipitate and hence lack of stability as a chelating agent; at pH 11.0, no precipitate, but stringy mud becoming gelatinous on standing; and at pH 10.5, again stringy mud that gelled on standing. The formulation of this drilling fluid was: 0.75 oil free barrel (bbl) saturated sodium chloride solution; 1.0 pound (avoirdupois) per barrel (ppb) carboxymethyl cellulose; 1.5 ppb starch; 1.0 ppb xanthan gum; 3.0 ppb sodium polyacrylate; and 1.5 ppb potassium hydroxide.

Phosphonates have also been considered as potential ligands for the formulation of iron based sulphide scavenger, but these have some potential disadvantages. Phosphonates are generally slightly toxic, poorly biodegradable and tend to be effective dispersants—all three are unattractive features for a compound to be used in a drilling fluid.

Nevertheless, because of the bio-friendly nature of iron, efforts have continued to find useful iron chelating agent for sulphide scavenging in drilling fluids.

The present invention provides methods for scavenging sulphide in high pH fluids that are particularly suitable for drilling fluids used in drilling wells in hydrocarbon-bearing subterranean formations. The methods employ an additive comprising an organic compound from a group capable of acting as a chelating agent with iron. The iron chelate compounds or complexes are stable at high pH and do not form gels in polymer based fluids, making the complexes or compounds excellent sulphide scavengers for use in drilling fluids. Particularly, gluconic acid has been found to form stable complexes with iron (II) at pH above 9 and even at pH ranging from about 11 to 12 or higher, the pH most commonly desired for drilling fluids that are in contact with soluble sulphide or hydrogen sulphide.

Iron(II) or ferrous gluconate is commonly used as an iron supplement for dietary purposes and thus is considered non-toxic. Further, the gluconic moiety is derived from glucose and thus iron (II) gluconate is also fully biodegradable. Heptagluconate may be substituted for gluconate in the compounds or complexes of this invention and the term "gluconate" as used herein shall be understood to encompass "heptagluconate" as well.

Iron (II) gluconate as a sulphide scavenger has an advantage of being a readily available and environmentally friendly or environmentally acceptable compound or complex. Moreover, iron(II) gluconate is effective as a sulphide scavenger. It also does not impair the properties of the drilling fluid to which it is added.

In the method of this invention, ferrous gluconate or an additive comprising ferrous gluconate is added to the drilling fluid. This additive may typically be added to the fluid in the mud pit, before the fluid has circulated or before the fluid contains any detectable amount of sulphur or hydrogen sulphide, as a prophylactic measure against any hydrogen sulphide the fluid may encounter downhole. However, alternatively or additionally, the additive may be added after the fluid has been circulating downhole and has already encountered sulphur or hydrogen sulphide and contains same.

The ferrous or iron gluconate may be added in solid or liquid form. If in liquid form, the preferred carrier fluid is water. Any other components of the additive should not be of the type that can interfere with the chelating action of the gluconate with the iron or with the stability of the complex. Further, any such other components should preferably not be of a type to cause crosslinking of polymers, particularly if the fluid is polymer based. The quantity of ferrous gluconate to be added will generally depend on the quantity of hydrogen sulphide desired to be removed or scavenged. Generally, one mole of ferrous gluconate will remove one mole of hydrogen sulphide. Stronger chelation of the iron may result when an excess of the gluconate is present in the fluid for the amount of hydrogen sulphide in the fluid.

To test the efficacy of this invention, particularly for use of the invention in high pH drilling fluids used in drilling wells in hydrocarbon-bearing subterranean formations, a series of experiments were conducted. These tests are described below.

EXPERIMENTS

EXAMPLES 1 AND 2

These tests were conducted to show the effect of adding iron(II)gluconate to a drilling fluid having a composition typical for that which would be used in drilling a well in a subterranean formation thought to contain hydrogen sulphide. Example 1 served as a control, with no iron(II) or other sulphide scavenger added to the drilling fluid. Example 2 involved adding 2 ppb ferrous gluconate to the drilling fluid, simulating an amount that might be added as a prophylactic measure against possible future influx of hydrogen sulphide in the formation. In these tests, the drilling fluid did not contain hydrogen sulphide or sulphide ions.

Details of the tests and the results, showing mud properties of the drilling fluid, are set forth in TABLE I.

TABLE I

| FORMULATION | EXAMPLE 1 | EXAMPLE 2 |
|---|---|---|
| Saturated NaCl brine | 0.751 bbl* | 0.751 bbl* |
| Carboxymethyl cellulose | 1.0 ppb** | 1.0 ppb** |
| Starch | 1.0 ppb | 1.5 ppb |
| Xanthan | 1.0 ppb | 1.0 ppb |
| Thinner | 3.0 ppb | 3.0 ppb |
| KOH | 1.5 ppb | |
| Barite | 338.0 ppb | 338.0 ppb |
| FE gluconate | — | 2 ppb |

| | FRESH | 16 HRS, 260° F. | FRESH | 16 HRS, 260° F. |
|---|---|---|---|---|
| 600/300*** | 135/97 | 44/28 | 68/45 | 85/55 |
| 200/100*** | 82/56 | 19/12 | 31/21 | 42/30 |
| 6/3*** | 15/12 | 3/2 | 6/5 | 8/6 |
| PV(cps) | 38 | 16 | 23 | 30 |
| YP(lb/100 ft²) | 59 | 12 | 22 | 25 |
| 10 sec gel (lb/100 ft²) | 15 | 2 | 7 | 6 |
| 10 min gel(lb/100 ft²) | 32 | 4 | 16 | 9 |
| API Fluid Loss (ml) | | 4.2 ml | | 3.2 ml |
| HTHP Fluid Loss (ml) | | 10.4 ml | | 9.6 ml |
| pH | 11.85 | 10.4 | 11.1 | 9.9 |

*bbl = oil field barrel (159 liters)
**ppb = concentration in pounds (avoirdupois) per barrel
***Rheometer data, i.e., the figures in the first or left hand colunm give the speed of rotation of the rheometer bob (rpm); the figures in the other colunms are the rheometer deflection The drilling fluids were assessed in a fresh condition and again after being enclosed in a metal cell and rolled in an oven at a temperature at 260 degrees Fahrenheit for 16 hours, to simulate the treatment of the drilling fluid in field conditions. As known to those skilled in the art, hot rolling at such temperatures used in these examples often causes some degradation of the polymers and a decrease in the viscosity of the drilling fluid. The tests results in TABLE I show that the untreated drilling fluid—Example 1—had higher rheology when fresh. However, the test results for Example 2 show that ferrous gluconate had the ability to stabilize the properties of the fluid against the thinning effect of high temperature ageing.

The filtration properties of drilling fluids are commonly measured by their ability to block filter papers as set forth in the standard API Fluid Loss Test and the HTHP Fluid Loss Test, standard tests well known to those in the oil industry. The numerical results of these tests in Example 1 and Example 2 are shown in TABLE I. These results represent the filtrate passing through the filter paper under standard conditions of temperature and pressure. Comparing the results of Example 1 and Example 2 shows that addition of ferrous gluconate to the drilling fluid in Example 2 was not detrimental to the filtration properties of the fluid.

The results shown in TABLE I for Examples 1 and 2 show that adding iron(II) or ferrous gluconate to drilling fluids does not impair the properties of the drilling fluids.

EXAMPLES 3, 4, AND 5

Tests were conducted to show the effect of adding iron (II)gluconate to a drilling fluid already contaminated with hydrogen sulphide. In preparing the fluid samples for testing, a quantity (1.5 grams) of sodium sulphide ($Na_2S$) was added to each sample of drilling fluid. The samples were then hot rolled and allowed to cool before any sulphide scavenger was added to Examples 4 and 5. Example 3 remained without any sulphide scavenger to serve as a control. After cooling, iron(II) gluconate was added as a sulphide scavenger to Examples 4 and 5 and all of the fluids were hot rolled again. In Example 4, iron(II) gluconate was added in solid form, and in Example 5, iron(II) gluconate was added in liquid form, to examine whether the physical form of the scavenger had any effect on its performance. Details of the tests and the results, showing mud properties of the drilling fluid, are set forth in TABLE II.

TABLE II

| FORMULATION | EXAMPLE 3 | EXAMPLE 4 | EXAMPLE 5 |
|---|---|---|---|
| Saturated NaCl brine | 0.751 bbl* | 0.751 bbl* | 0.751 bbl* |
| Carboxymethyl cellulose | 1.0 ppb** | 1.0 ppb** | 1.0 bbp** |
| Starch | 1.5 ppb | 1.5 ppb | 1.5 ppb |
| Xanthan | 1.0 ppb | 1.0 ppb | 1.0 ppb |
| Thinner | 3.0 ppb | 3.0 ppb | 3.0 ppb |
| KOH | 1.5 ppb | 1.5 ppb | 1.5 ppb |
| Barite | 338.0 ppb | 338.0 ppb | 338.0 ppb |
| $Na_2S$ | 1.5 ppb | 1.5 ppb | 1.5 ppb |
| Fe gluconate | — | 2.0 ppb (solid) | 2.0 ppb (in solution) |

| | Fresh | 16 hrs; 260° F. | Fresh | 16 hrs; 260° F. | Fresh | 16 hrs; 260° F. |
|---|---|---|---|---|---|---|
| 600/300*** | 68/40 | 27/15 | 41/24 | 30/19 | 34/19 | 30/19 |
| 200/100*** | 28/17 | 10/8 | 17/12 | 12/9 | 13/8 | 12/9 |
| 6/3*** | 3/2 | 4/3 | 3/2 | 2/1 | 2/1 | 2/1 |
| PV (cps) | 28 | 12 | 17 | 11 | 15 | 11 |
| YP (lb/100 ft$^2$) | 12 | 3 | 7 | 8 | 4 | 8 |
| 10 sec gel (lb/100 ft$^2$) | 2 | 3 | 2 | 1 | 1 | 1 |
| 10 min gel (lb/100 ft$^2$) | 6 | 5 | 4 | 3 | 3 | 3 |
| API Fluid loss (ml) | | N/D | | 3.6 ml | | 3.8 ml |
| HTHP (ml) | | N/D | | 13.8 ml | | 12.8 ml |
| pH | 12.4 | 11.1 | 12.3 | 11.6 | 12.3 | 11.6 |

*bbl = oil field barrel (159 liters)
**ppb = concentration in pounds (avoirdupois) per barrel
***Rheometer data, i.e., the figures in the first or left hand colunm give the speed of rotation of the rheometer bob (rpm); the figures in the other columns are the rheometer deflection The results in TABLE II show that iron(II) gluconate behaves the same whether in liquid or solid form—one form does not appear to perform significantly better than the other as a sulphide scavenger in drilling fluids. All of the drilling fluids tested in these Examples 3, 4 and 5 showed significant degradation of rheological properties, probably because all had been hot rolled for a total of 32 hours. However, the untreated fluid, i.e., the fluid without the iron(II) gluconate additive,—Example 3—showed more degradation than the fluids with the iron(II) gluconate additive—Examples 4 and 5.

Like the results in TABLE I, the results in TABLE II indicate that adding iron(II) or ferrous gluconate to drilling fluids does not impair the properties of the drilling fluids.

EXAMPLES 6, 7, AND 8

In Examples 3, 4, and 5 discussed above, the samples were pretreated with 1.5 ppb sodium sulphide. However, in field conditions, the drilling fluid may be exposed to a higher concentration of sulphide or hydrogen sulphide before the iron(II) gluconate scavenger is introduced into the drilling fluid. This circumstance would lead to a higher loading of iron sulphide in the drilling fluid. To test whether such higher loading could lead to detrimental effects, drilling fluid samples—Examples 6, 7, and 8—were prepared with a concentration of 2.8 ppb sodium sulphide (or about twice the concentration used in Examples 3, 4 and 5). Solid or liquid iron(II) gluconate was added to Examples 7 and 8, while Example 6 served as a control, and the fluids were hot rolled for 16 hours.

Details of the tests and the results, showing mud properties of the drilling fluid, are set forth in TABLE III.

TABLE III

| FORMULATION | EXAMPLE 6 | EXAMPLE 7 | EXAMPLE 8 |
|---|---|---|---|
| Saturated NaCl brine | 0.751 bbl* | 0.751 bbl* | 0.751 bbl* |
| Carboxymethyl cellulose | 1.0 ppb** | 1.0 ppb** | 1.0 bbp** |
| Starch | 1.5 ppb | 1.5 ppb | 1.5 ppb |
| Xanthan | 1.0 ppb | 1.0 ppb | 1.0 ppb |
| Thinner | 3.0 ppb | 3.0 ppb | 3.0 ppb |
| KOH | 1.5 ppb | 1.5 ppb | 1.5 ppb |
| Barite | 338.0 ppb | 338.0 ppb | 338.0 ppb |
| $Na_2S$ | 2.8 ppb | 2.8 ppb | 2.8 ppb |
| Fe gluconate | — | 2.0 ppb (solid) | 2.0 ppb (in solution) |

| | Fresh | 16 hrs; 260° F. | Fresh | 16 hrs; 260° F. | Fresh | 16 hrs; 260° F. |
|---|---|---|---|---|---|---|
| 600/300*** | | 25/15 | 47/29 | 55/35 | 60/40 | 55/35 |
| 200/100*** | | 10/7 | 20/12 | 28/18 | 30/10 | 28/19 |
| 6/3*** | | 3/2 | 3/2 | 5/4 | 5/4 | 5/4 |
| PV (cps) | | 10 | 18 | 20 | 20 | 20 |
| YP (lb/100 ft$^2$) | | 5 | 11 | 15 | 20 | 15 |
| 10 sec gel (lb/100 ft$^2$) | | 3 | 2 | 6 | 6 | 6 |
| 10 min gel (lb/100 ft$^2$) | | 7 | 4 | 13 | 10 | 11 |
| API Fluid loss (ml) | | N/D | | 4.6 ml | | 5.6 ml |
| HTHP (ml) | | N/D | | 12.0 ml | | 14.0 ml |
| pH | 12.4 | N/D | 12.3 | 11.3 | 12.3 | 11.3 |

*bbl = oil field barrel (159 liters)
**ppb = concentration in pounds (avoirdupois) per barrel
***Rheometer data, i.e., the figures in the first or left hand column give the speed of rotation of the rheometer bob (rpm); the figures in the other columns are the rheometer deflection The results shown in TABLE III are similar to the results shown in TABLES I and II. That is, adding iron(II) or ferrous gluconate to drilling fluids does not impair the properties of the drilling fluids. Also, the iron(II) or ferrous gluconate additive is equally effective as a sulphide scavenger in solid or liquid form.

EXAMPLES 9, 10 AND 11

Tests were conducted to show the effect of adding hydrogen sulfide to a drilling fluid already treated with iron(II) gluconate scavenger. In preparing the fluid samples for testing, a quantity (2.8 grams) of sodium sulphide ($Na_2S$) was added to each sample of drilling fluid. The samples were then hot rolled, after which iron(II) gluconate was added as a sulphide scavenger and the fluids were hot rolled again.

Details of the tests and the results, showing mud properties of the drilling fluid, are set forth in TABLE IV.

TABLE IV

| FORMULATION | EXAMPLE 9 | EXAMPLE 10 | EXAMPLE 11 |
|---|---|---|---|
| Saturated NaCl brine | 0.751 bbl* | 0.751 bbl* | 0.751 bbl* |
| Carboxymethyl cellulose | 1.0 ppb** | 1.0 ppb** | 1.0 bbp** |
| Starch | 1.5 ppb | 1.5 ppb | 1.5 ppb |
| Xanthan | 1.0 ppb | 1.0 ppb | 1.0 ppb |
| Thinner | 3.0 ppb | 3.0 ppb | 3.0 ppb |
| KOH | 1.5 ppb | 1.5 ppb | 1.5 ppb |
| Barite | 338.0 ppb | 338.0 ppb | 338.0 ppb |
| Fe gluconate | 2.0 ppb | 2.0 ppb | 2.0 ppb |
| Na gluconate | 1.0 ppb | 2.0 ppb | — |
| Na$_2$S | 2.8 ppb | 2.8 ppb | 2.8 ppb |

|  | Fresh | 16 hrs; 260° F. | Fresh | 16 hrs; 260° F. | Fresh | 16 hrs; 260° F. |
|---|---|---|---|---|---|---|
| 600/300*** | 49/26 | 34/20 | 59/30 | 38/23 | 48/31 | 29/19 |
| 200/100*** | 18/10 | 14/9 | 20/12 | 16/10 | 22/13 | 12/8 |
| 6/3*** | 2/1 | 6/2 | 2/1 | 3/2 | 4/2 | 3/2 |
| PV (cps) | 23 |  | 14 |  | 29 |  | 15 |  | 17 |  | 10 |
| YP (lb/100 ft$^2$) | 3 | 6 | 1 | 8 | 14 | 9 |
| 10 sec gel (lb/100 ft$^2$) | 2 | 3 | 2 | 3 | 3 | 3 |

TABLE IV-continued

| 10 min gel (lb/100 ft$^2$) | 12 | 10 | 4 | 10 | 7 | 7 |
|---|---|---|---|---|---|---|
| API Fluid loss (ml) | — | 5.4 | — | 5.2 | — | 6.0 |
| HTHP (ml) | — | 13.0 | — | 12.6 | — | 13.6 |
| pH | 11.6 | 11.4 | 11.58 | 11.3 | 11.65 | 11.3 |

*bbl = oil field barrel (159 liters)
**ppb = concentration in pounds (avoirdupois) per barrel
***Rheometer data, i.e., the figures in the first or left hand column give the speed of rotation of the rheometer bob (rpm); the figures in the other columns are the rheometer deflection The results shown in TABLE IV are similar to the results shown in the other tables discussed above.

EXAMPLES 12, 13, 14, 15, AND 16

An important property of iron(II) gluconate is that it reacts quantitatively with sulphide in solution. The sulphide content of filtrate from the Examples discussed in TABLES II–IV above, however, cannot accurately show this property, however, because barite, present in all of these examples, has some slight ability to scavenge sulphide ions, probably due to the small zinc content in barite. To show this property of iron(II) gluconate, a series of specially formulated fluids was made up with the aim of measuring the stoichiometry of the sulphide/iron(II) gluconate reaction. Each test series omitted any constituent or component that might interfere with accurate analytical determination of sulphide in the treated fluid.

In the method for these tests, sodium chloride brine (1.2 sg) was treated with potassium hydroxide to bring the pH of the fluid to about 11.5 or 12 for each Example. Iron(II) gluconate was added to Examples 14, 15, and 16 but not to Examples 12 or 13. Examples 12 and 13 served as controls to access the initial concentration of sulphide. The fluids were well mixed and sodium sulphide (1.1 g or 2.5 g) was added to each Example before rolling at 150 degrees Fahrenheit for two hours. Examples 12 and 13 were filtered and the filtrate was analyzed for sulphide. For each Example 12–16, an experimentally determined concentration of the sulphide was recorded along with the expected sulphide concentration. The expected final concentration of sulphide was calculated on the basis of the amount of iron and sulphide added to the reaction mixture, incorporating the assumption that the reaction was quantitative.

Details of the tests and the results are set forth in TABLE V.

TABLE V

| EXAMPLE | CHELATE USED | MOLES OF S$^-$ ADDED (mole/350 ml) | SULPHIDE DETERMINED IN FILTRATE (S mg/l) | MOLES OF METAL SCAVENGER per 350 ml | PREDICTED SULPHIDE IN FILTRATE (mg/l) |
|---|---|---|---|---|---|
| 12 | No chelate | 0.0034 | 300 | — | 300 |
| 13 | No chelate | 0.0074 | 700 | — | 700 |
| 14 | 2.0 g Fe gluconate | 0.0034 | 0 | 0.0048 | 0 |
| 15 | 3.0 g Fe gluconate | 0.007 | 200 | 0.0048 | 200 |
| 16 | 2.0 g Fe gluconate + 1.0 g Na gluconate | 0.0075 | 200 | 0.0048 | 200 |

The results in TABLE V show that the reaction between iron(II) gluconate and sulphide is quantitative. When the iron(II) gluconate additive was present in molar excess, the residual sulphide concentration was zero, indicating that this iron chelate can precipitate all of the sulphide in solution. Furthermore, the reaction was complete within two hours of contact time. This rapid reaction is probably due to ionic interaction between the iron and sulphide. However, for whatever reason, this rapid reaction indicates that iron(II) gluconate can be an effective scavenger of sulphide ions in drilling fluids.

Further, considering the results shown in TABLES I–IV, use of ferrous or iron(II) gluconate as a sulphide scavenger in drilling fluids is not detrimental to the rheology of the fluid or to the fluid loss performance of the fluid. The fluids containing the scavenger surprisingly yielded even better rheological results than fluids hot rolled with sulphide only. That is, not only does iron(II) gluconate not detract from desirable properties of drilling fluid, but iron(II) gluconate improves those properties.

The foregoing description of the invention is intended to be a description of preferred embodiments. Various changes in the details of the described composition and method can be made without departing from the intended scope of this invention as defined by the appended claims.

I claim:

1. A method of removing sulphide ion from a polymer based fluid having a pH of at least about 11 comprising:

adding a ferrous gluconate chelating agent to said fluid in sufficient quantity to form iron sulphide with the sulphide ion; and mixing the chelating agent with the fluid and forming iron sulphide.

2. The method of claim 1 further comprising maintaining the ferrous gluconate at a level to maintain the sulphide concentration below a certain desired level.

3. The method of claim 1 wherein the quantity of gluconate added to said fluid exceeds the quantity needed to react with all of the sulphide ion in said fluid.

4. A method of reducing the hydrogen sulphide concentration in a polymer based drilling fluid having a pH of at least about 11 comprising:

adding a ferrous gluconate compound to said fluid; and allowing said ferrous gluconate to react with said hydrogen sulphide such that sulphide is precipitated.

5. The method of claim 4 wherein said sulphide is precipitated as ion sulphide.

6. The method of claim 4 wherein said drilling fluid has a pH ranging from about 11 to about 12.

* * * * *